United States Patent Office 3,306,622
Patented Feb. 28, 1967

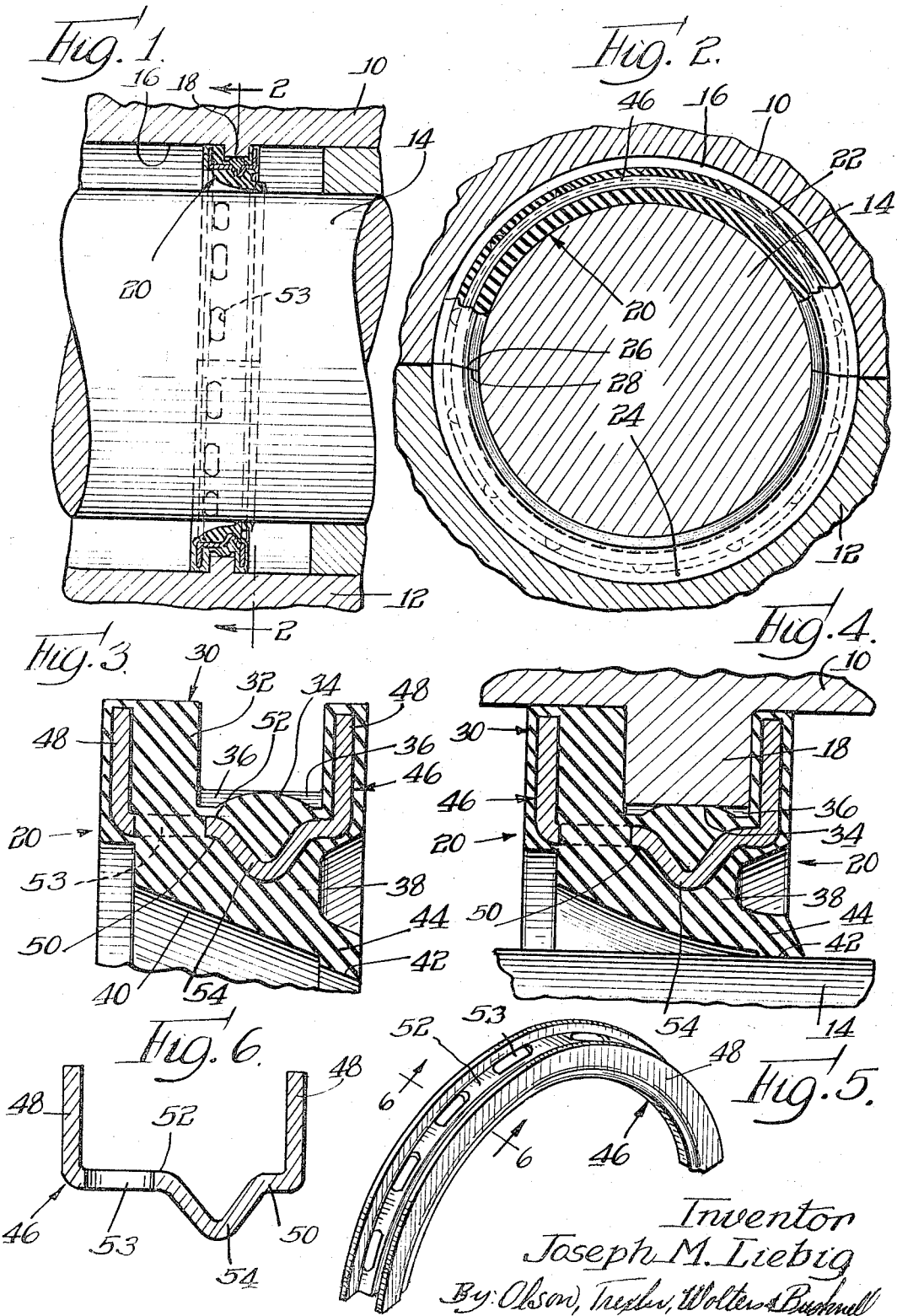

3,306,622
REINFORCED BEARING SEAL
Joseph M. Liebig, Wheaton, Ill., assignor to Illinois Milling, Inc., Chicago, Ill., a corporation of Illinois
Filed Jan. 26, 1965, Ser. No. 428,054
5 Claims. (Cl. 277—178)

This invention relates to an improved oil seal for sealing against the axial passage of oil or the like along a rotating shaft, and is particularly concerned with an oil seal for the crank shaft of an internal combustion engine, as adjacent the rear main bearing.

It is recognized that hot oil has very high capillarity relative to metal engine parts and tends to creep along any openings, regardless of how small. For many years, oakum was used packed in a circumferential groove in the engine block and bearing cap of automotive engines and having a rotating fit with the crankshaft. This material held up for only a limited time in service, and could be replaced only by removal of the crankshaft. For longer service and for more ready replacement, it has in recent years become more prevalent to utilize a bearing seal made of metal reinforced synthetic rubber. Such rubber must be resistant to hot oil and abrasion, and must also be relatively inexpensive. Neoprene has been found to be one satisfactory example. It has also been customary to use steel as the insert due to the strength and rigidity thereof coupled with the low price of steel.

In one form of seal the engine block and bearing cap have been provided with an annular, circumferential, radially inwardly extending rib. Concomitantly the seal has had a circumferential external groove, and the reinforcing element or member has been of channel shape, opening outwardly so that the reinforced rubber seal groove might grip the rib. As will be understood, the seal has been made in two semi-circular portions for ease of installation. If one seal wears out, it is not necessary to remove the crank-shaft, but only to remove the bearing cap and push a new seal into place circumferentially, the old seal being pushed out ahead of it in the block. The portion of the seal in the bearing cap is, of course, quite readily replaceable.

Prior art seals with which I am familiar have had more or less wedge-shaped lips extending inwardly from the body of the seal and forming a riding or rotating engagement with the crankshaft. Such lips must be adequately reinforced to keep them from collapsing away from the crankshaft, and yet they must not be so rigid against the crankshaft as to wear out rapidly. Prior art seals of the type here in question and known to me have not been satisfactory in this respect.

Accordingly, it is an object of this invention to provide a reinforced bearing seal providing improved support for the sealing lip.

More specifically, it is an object of this invention to provide a bearing seal in which a reinforcing element is shaped to provide improved reinforcement for the sealing lip.

Other and further objects and advantages of the present invention will be apparent from the following description when taken in connection with the accompanying drawings wherein:

FIG. 1 is a longitudinal sectional view through a crankshaft and adjacent engine portions showing my improved seal in place;

FIG. 2 is a cross sectional view taken substantially along the line 2—2 in FIG. 1;

FIG. 3 is a cross sectional view through the improved seal as taken along a radial plane along the axis of the seal;

FIG. 4 is a view similar to FIG. 3 showing the seal in installed position;

FIG. 5 is a perspective view of the reinforcing or stiffening member; and

FIG. 6 is a cross sectional view through the stiffening element as taken substantially along the line 6—6 and on an enlarged scale.

Referring now in greater particularity to the drawings, certain parts of an automotive or the like engine are shown therein including portions of the engine block 10 and bearing cap 12 with a crankshaft 14 passing therethrough. The bore 16 through which the crankshaft passes is provided with an internal circumferential flange 18, formed partly in the block 10 and partly in the bearing cap 12. The bearing seal 20 forming the subject matter of the present invention is mounted on the flange 18 and forms a sliding or riding engagement with the crankshaft 14.

The bearing seal is made in two like circumferential sections 22 and 24. One end of each section is provided with a lip 26. This end, the counterclockwise limiting end in each case in FIG. 2, is formed at an angle of 13° relative to a diameter. The corresponding mating part 28 of the adjacent clockwise limiting end of the adjacent semi-circular seal portion is cut off at 7°, i.e. a 6° overlap. The seal is made of rubber, and when it is pressed into place, the lip 26 compresses to form a tight engagement with the adjacent portion 28 of the adjacent semi-circular bearing seal part to form a leak proof joint.

The seal 20, as best seen in FIGS. 3 and 4, comprises an elastomeric body 30 preferably made of a synthetic rubber which is resistant to high temperatures and oil, and which is reasonably priced. Neoprene is one satisfactory example. The body is formed about its outer circumference with a groove 32 extending from end-to-end of each semi-circular portion, and in the bottom of each groove there is a circumferential rib 34 of arcuate cross section for forming a sealing engagement against the flange 18, the rib slightly flattened in forming such engagement as seen in FIG. 4. In addition, there are circumferentially spaced, longitudinally extending fillets or beads 36 for reinforcing the rib 34. As will be seen, the groove is somewhat off center as measured axially of the seal.

In addition to the body 30 the seal is provided with a radially inwardly extending lip 38 having an oblique or conical inner surface 40 terminating at its inner edge at an inwardly offset conical sealing surface 42. As will be seen, the sealing surface 42 is on an extending tip 44 which is not backed up by the mass of the lip.

Each of the two semi-circular portions of the bearing seal is provided with a reinforcing member 46 arcuately coextensive therewith and imbedded in the rubber body. The reinforcing member conveniently is formed of steel or other sheet metal, although it is contemplated that nonmetallic substances might be used, such as plastic resins, hard rubber, etc. which would have certain inherent advantages, including improved bonding of the rubber body thereto. As may be seen in FIGS. 2 and 5, each of the reinforcing members 46 is semi-circular when viewed in an axial direction, and as more particularly may be seen in FIGS. 3–5 (and also FIG. 1), the reinforcing member is more or less U-shaped in cross section. The reinforcing member 46 has a pair of axially spaced, parallel arms or flanges 48 integrally joined by a bight 50 including a cylindrical section 52 joined to one of the flanges 48 and provided with a plurality of circumferentially spaced apertures 53 which are provided for better bonding and keying of the rubber to the reinforcing member, and also to provide for flow of the rubber in the mold. As will be observed in FIGS. 1 and 5 the holes 53 are elongated arcuately or circumferentially of the seal.

The bight 50 further includes a depending or reentrant portion 54 which is generally U-shaped in cross section and which integrally interconnects the cylindrical portion 52 and the opposite flange 48. As will be seen particularly in FIGS. 3 and 4 the V-shaped portion 54 extends radially inwardly into the body and lip 38 to reinforce the massive part of the lip and thereby to provide improved support for the fin or edge portion 42, 44. It will be apparent in FIG. 4 that installation of the bearing seal in the engine and about the crankshaft 14 causes deformation of the fin by an outward deformation thereof to convert the conical surface 42 into a cylindrical bearing surface bearing against the outer circumference of the crankshaft 14 and forming a sliding fit therewith.

Furthermore, in such installation the outer circumference of the rib 34 is flattened somewhat against the flange 18, whereby to provide a good seal at that location.

The flanges 48 act through the adjacent rubber portions securely to grip the flange 18, and thereby to hold the seal in installed position. As will be understood, the sump or region of oil under some pressure is to the right in FIGS. 1 and 4, and the tendency of oil to pass from right to left is what is overcome by the present seal.

The specific embodiment of the invention as herein shown and described is for illustrative purposes. Various changes in structure will no doubt occur to those skilled in the art, and will be understood as forming a part of the present invention insofar as they fall within the spirit and scope of the appended claims.

The invention is claimed as follows:

1. An oil seal comprising an arcuate body of elastomeric material, an integral sealing lip of elastomeric material extending substantially radially in from said body and having a sealing edge portion adapted to engage a rotating shaft, and a substantially rigid arcuate reinforcing member embedded in said elastomeric body and extending arcuately substantially from end-to-end thereof, said reinforcing member body being substantially U-shaped in cross section having a pair of spaced apart substantially parallel side walls and an interconnecting bight, said bight being joined to the radially inner edges of said sidewalls and being disposed relatively adjacent the radially inner portion of said elastomeric body, and adjacent said lip, said bight having an arcuate rib extending radially inwardly into said lip and reinforcing said lip in the vicinity of said sealing edge.

2. An oil seal as set forth in claim 1 wherein said reinforcing member is formed of sheet material and wherein the rib and the bight of said reinforcing member is deformed inwardly from said bight.

3. An oil seal as set forth in claim 1 wherein the rib is arcuately continuous substantially from end-to-end of said reinforcing member.

4. An oil seal comprising an arcuate body of elastomeric material, an integral sealing lip of elastomeric material extending substantially radially in from said body and comprising a wedge-shaped in cross section mass having a radially inner portion remote to said body, and a fin on said inner portion extending axially beyond said wedge-shaped mass and adapted for running engagement with a rotating shaft, and a substantially rigid arcuate reinforcing member embedded in said body and extending arcuately substantially from end-to-end thereof, said reinforcing member body being substantially U-shaped in cross section having a pair of spaced apart substantially parallel sidewalls and an interconnecting bight, said bight being joined to the radially inner edges of said sidewalls and being disposed relatively adjacent the radial inner portion of said elastomeric body, said bight having an arcuate rib extending radially into said wedge-shaped mass of said lip and adjacent said fin to reinforce said lip.

5. An oil seal comprising an arcuate body of elastomeric material and having a radially outwardly opening groove extending arcuately substantially from end-to-end thereof, an integral sealing lip of elastomeric material extending substantially radially in from said body and extending substantially from end-to-end arcuately thereof, said lip comprising a wedge-shaped mass having a radially inner portion remote relative to said body and a fin on said inner portion extending axially beyond said wedge-shaped mass, and a substantially rigid arcuate reinforcing member embedded in said elastomeric body and extending arcuately substantially from end-to-end thereof, said reinforcing member body being of sheet material construction and substantially U-shaped in cross section having a pair of spaced apart substantially parallel sidewalls and an interconnecting bight, said bight being joined to the radially inner edges of said sidewalls and being disposed relatively adjacent the radially inner portion of said elastomeric body, said bight having an arcuate rib extending substantially from end-to-end thereof and deformed radially inwardly from said bight into said lip and reinforcing said lip in the vicinity of said fin.

References Cited by the Examiner

UNITED STATES PATENTS

| | | | |
|---|---|---|---|
| 2,647,002 | 7/1953 | Brummer | 277—178 |
| 2,719,743 | 10/1955 | Brummer et al. | 277—178 |
| 2,729,482 | 1/1956 | Kusatka | 277—178 |
| 2,826,441 | 3/1958 | Niessen | 277—178 |

SAMUEL B. ROTHBERG, *Primary Examiner.*